G. McCONNELL.
Sleigh.
No. 168,039.
Patented Sept. 21, 1875.
FIG. I
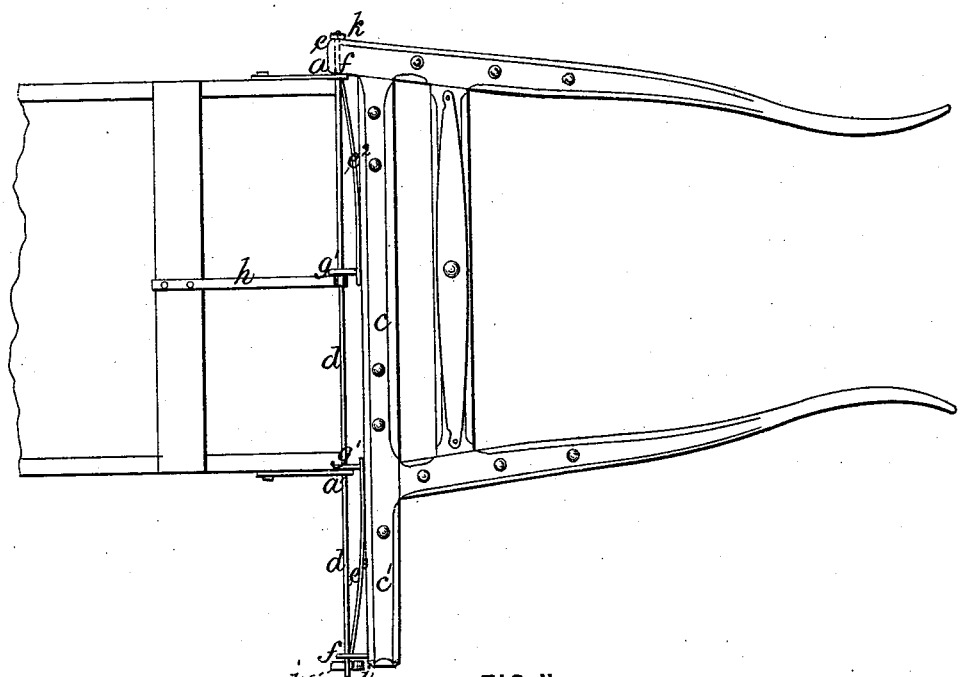
FIG II
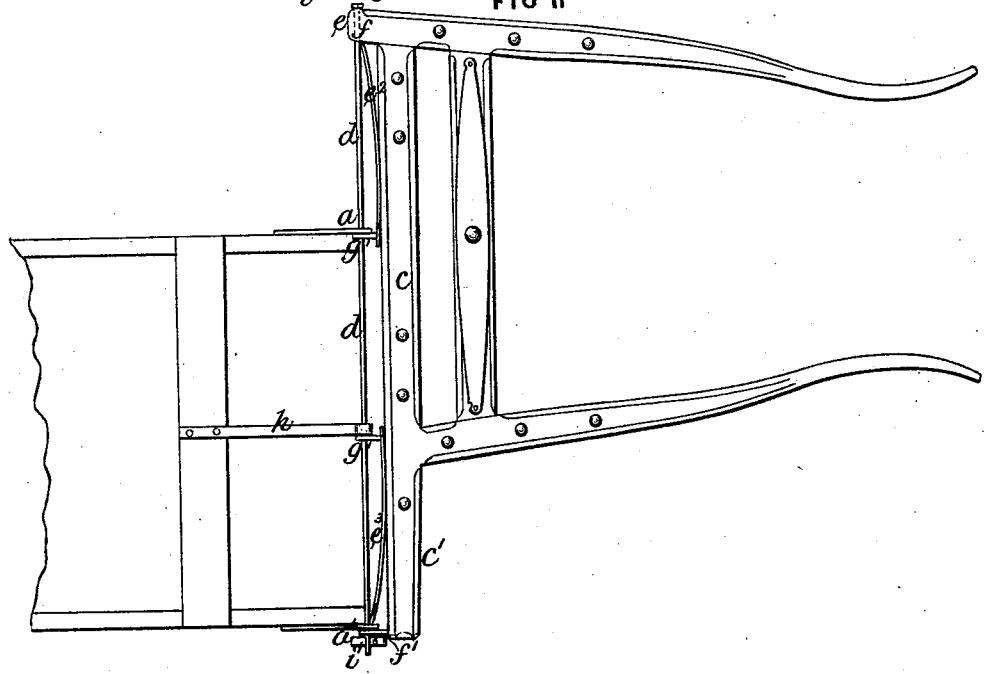
WITNESSES
John E. Laing.
J.H. Rutherford
INVENTOR
George McConnell
By Johnson and Johnson
his Attorneys.

UNITED STATES PATENT OFFICE.

GEORGE McCONNELL, OF OCONTO, WISCONSIN.

IMPROVEMENT IN SLEIGHS.

Specification forming part of Letters Patent No. 168,039, dated September 21, 1875; application filed May 19, 1875.

*To all whom it may concern:*

Be it known that I, GEORGE MCCONNELL, of Oconto, in the county of Oconto and State of Wisconsin, have invented certain new and useful Improvements in Attaching Sleigh-Thills; and I do hereby declare that the following is a full, clear, and exact description thereof, which will enable others skilled in the art to which it pertains to make and use the same, reference being had to the accompanying drawing and to the letters of reference marked thereon, which form a part of this specification.

The object of my invention is to construct and adapt sleigh-thills so as to be capable of adjustment at will to right or left to permit the horse to travel in the center of the road or upon one side, in single or double track, and to entirely dispense with the objectionable cross-bar to which the thills are generally attached.

To this end my invention consists in the means and manner of adapting thills to sleighs, whereby they may be made capable of adjustment at little expense, and at the same time dispense with the ordinary objectionable front cross-bar sticking out on both sides of the sleigh, as more fully set forth in the claim.

Figure 1 represents a top view of a sleigh with the shafts adapted to travel in the middle of the road; and Fig. 2 a similar view, with the shafts adapted to travel at one side of the road.

Sleighs are always provided with the eyebolts or bearings *a a* upon the ends of the runners, and in these eyes fit the pintles or journals, which are attached by a shank to a long wooden cross-bar, the thills being attached to the latter. This bar has been found to be objectionable for many reasons: first, as it is cumbersome and awkward, and results in bringing the horse too far from the sleigh; secondly, its projecting ends upon each side of the sleigh necessitate turning far out into the deep snow in order to pass a sleigh without striking; and, thirdly, it greatly increases the cost of manufacture of adjustable thills, and subserves no useful purpose whatever. I dispense with this bar altogether, and thus obviate the foregoing objections and greatly simplify and cheapen the construction. Any pair of thills can be readily adapted to a sleigh, as will hereinafter be seen, and made adjustable for the purpose above set forth by my invention at a very little cost. At the rear, and crosswise of a pair of thills, is a long bar, *c*, into which tenons on the former are mortised, and to which the thills are held by suitable metal braces. This bar extends to the left, as at *c′*, and forms a brace to the thills and receives the strain from the whiffletree, and holds the thills from being turned laterally or becoming loose in the joints. Running parallel with the bar *c c′*, and immediately in the rear thereof, is a pintle or metal bolt, *d*, which forms the hinge between the thills and the sleigh, and it is held in a projection, *e*, upon the rear of one of the thills by a suitable bearing or eye, *f*, through which it passes, and also passes through an eyebolt, *f′*, attached to the rear of the bar *c c′* at the opposite side of the thills. Attached to the rear of the bar *c* are two eyebolts, *g g′*. The thills are attached to the sleigh, and at the same time hinged thereto by the bolt *d* being passed from left to right through the eye *f* upon projection *e*, thence through the eyebolt *a* upon the runner, and thence through the eyes *g g′*, and finally through the eye *a′* upon the right runner where a suitable locking-pin, *i*, holds the bolt from endwise movement, the opposite end of the bolt being provided with a head, *k*. Extending from, and attached to, the sleigh is a suitable supporting-strap, *h*, which grasps the rod *d* centrally and holds it from being bent by any undue strain. Secured to the rear of bar *c* are two short, flat metal spring-catches, $e^2$ $e^3$, extending laterally in opposite directions, and having their free ends resting against the rod *d*. The ends of these springs have suitable thumb-pieces or projections upon which the thumb of the driver is pressed in order to release and shift the thills from one position to another.

These springs do not extend to the side piece *e* or eyebolt *f′*, but leave a short space for accommodating the eyebolts or bearings *a a′* upon the runners, when the thills are shifted from one side to the other, as follows: The thills being in the position for the horse to travel in the left-hand runner-track, should the driver wish to cause him to travel in the center of the road, the right-hand spring is pressed with the thumb, which releases the eyebolt $a'$ at that side, and the thills are easily thrown to the right, and the eyebolt $a$ runs under the spring $e^3$, which latter automatically falls behind it and holds the thills in this position. In order to shift the thills back to the position shown in the drawing the left spring $e^2$ is pressed back and the thills are thrown to the left, when the spring $e^2$ drops behind the eyebolt $a'$, and thus holds the thills in this position.

The central eyebolts $g$ $g'$ subserve an important office in both of the positions in which the thills are placed, as they alternately strike against the eyebolts $a$ $a'$ and the straps $h$, thus forming in each position two auxiliary bearings for the hinged thills.

The shifting of the thills can be accomplished in a moment by a child while the horse is moving and drawing the sleigh by leaning forward and pressing the proper spring, and at the same time inclining the horse to the side or center of the road, as the case may be.

I claim—

1. The combination of the thill-bar $c$, having the projection $c'$, pintle-bar $d$, of equal length therewith, springs $e^2$ $e^3$, and sleigh-frame having eyes $a$ $a'$ attached to the runners thereof, but without the usual front cross-piece, as shown and described.

2. The combination of the thill-bar $c$, having the projection $c'$, pintle-bar $d$, of equal length therewith, springs $e^2$ $e^3$, and sleigh-frame having eyes $a$ $a'$, attached to the runners thereof, with the intermediate pintle-brace strap $h$, as described.

In testimony that I claim the foregoing as my own I have affixed my signature in presence of two witnesses.

GEORGE McCONNELL.

Witnesses:
  JAS. McGEE,
  J. O'KELIHER.